No. 791,019. PATENTED MAY 30, 1905.
J. A. FERGUSON.
PROCESS OF MOLDING TILE.
APPLICATION FILED JAN. 24, 1905.
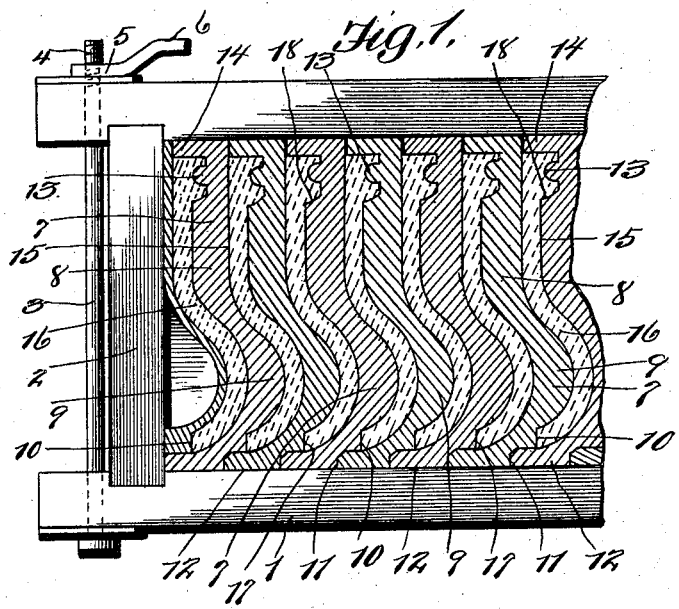
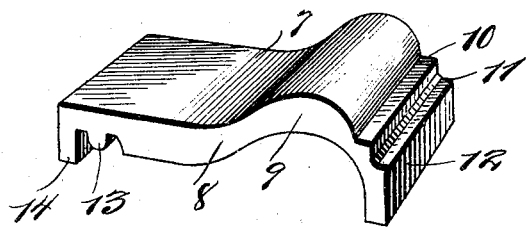
Witnesses
Robert A. Boswell
F. A. Spencer
Inventor
John Albert Ferguson.
By E. N. Bond
Attorney No. 791,019.

Patented May 30, 1905.

UNITED STATES PATENT OFFICE.

JOHN ALBERT FERGUSON, OF DENVER, COLORADO.

PROCESS OF MOLDING TILE.

SPECIFICATION forming part of Letters Patent No. 791,019, dated May 30, 1905.

Application filed January 24, 1905. Serial No. 242,494.

*To all whom it may concern:*

Be it known that I, JOHN ALBERT FERGUSON, a citizen of the United States of America, and a resident of Denver, in the county of Denver and State of Colorado, have invented certain new and useful Improvements in Processes of Molding Tile, of which the following is a specification.

This invention relates to certain new and useful improvements in the method of molding tile for roofs or for ornamentation of any kind. It has for its objects, among others, to provide for the making of a plurality of tile simultaneously by the employment of a plurality of removable fillers of any desired character, the cement or other material of which the tile are to be formed being run into the spaces between the fillers and allowed to set, after which the mold-box is opened and the mold product removed with the fillers, beginning at the end of the mold-box. In this way I am enabled to mold tile of a formation that would otherwise prevent their manufacture in quantity at the one and the same time.

The accompanying drawings, which form a part of this specification, together with the numerals of reference marked thereon, clearly illustrate the present invention. In the drawings, Figure 1 is a sectional horizontal section through a mold-box, showing the fillers in position and the articles molded in the spaces therebetween, parts of the mold-box being shown in top plan. Fig. 2 is a side elevation showing the manner of laying the tile. Fig. 3 is a perspective view of one of the fillers removed.

Like numerals of reference indicate like parts in the different views where they appear.

In carrying out my invention I employ a mold-box 1 with a removable end 2, which may be held closed in any suitable manner, so as to be readily removed after the tile have been molded. In this instance I have chosen to show it as held closed by means of a rod 3, having threaded end 4 and a nut 5, provided with a handle 6; but this is only one of the conventional forms which may be employed.

7 represents removable fillers which may assume any configuration, depending upon the configuration to be given to the completed or molded tile. In the present illustration the filler shown is formed with the body portion 8, having the rounded bulge 9 near one end and adjacent said bulge, with a square offset 10, and adjacent said offset with another offset 11, which may assume any desired form, the end 12 of the filler being of any required length beyond the said offset 11, according to the character of the tile to be molded. The other end of the filler in this instance is formed with the rounded projection 13 of less depth than the end 14, as seen best in Fig. 3, so as to produce the rounded depression in the molded tile. This projection may be of any other contour, as may be required.

The fillers are interfitting, as shown in Fig. 1, in which view they are shown as in position in the mold-box and wherein it will be noticed that the end 12 of the one filler fits in the offset 11 of the adjacent filler, the spaces 15 between the fillers being of course of the configuration which it is desired to give the completed tile and which spaces are given different forms by the employment of fillers of different configuration, as will be readily understood. After the fillers are placed in position within the mold-box the concrete or other material employed is run into the spaces 15 and allowed to set, forming the tile 16. Then the mold-box is opened and the molded product 16 removed with the fillers, beginning at the end of the box, the end 2 of the said box being removed in an obvious manner. These fillers, which are unyielding, interlocking, as they do, and having the double offset at one end, form at such end obstructions, which prevent the plastic material from running out at the point where the fillers overlap, thus insuring plain straight end portions to the tiles. By this means any given number of tile may be molded at the same time, the size of the box being in proportion to the number of tile to be formed. After the tile and fillers have been removed the fillers or a different set of different shape are placed in position in the mold-box, the removable end 2 replaced, and the concrete or other material again run into the spaces between the fillers, and thus another lot of the tile molded, which are of course removed in the same manner as above described.

By means of the interfitting fillers the fillers are held against displacement, and thus all the tile formed by the one set of fillers must of necessity be of exactly the same configuration, so that when laid in the manner shown in Fig. 2 the ends 17 will each fit exactly against the shoulder 18 on the end of the next adjacent tile, as will be readily understood from an inspection of said Fig. 2. In this view 19 represents the sheathing upon which the tiles are laid.

What is claimed as new is—

The herein-described process of simultaneously molding a plurality of ornamental tile, which consists in introducing into a mold-box a series of detachable unyielding fillers, interengaging said fillers with each other to form spaces therebetween, and presenting obstructions at each end of said spaces introducing the plastic material into said spaces and between the ends formed by said interengaging fillers, allowing the said material to set and then removing alternately the fillers and the molded product.

Signed by me at Denver, Colorado, this 21st day of January, 1905.

JOHN ALBERT FERGUSON.

Witnesses:
EVELYN S. CALVERT,
EMMA L. KEMP.